United States Patent [19]

Jones et al.

[11] Patent Number: 4,955,238

[45] Date of Patent: Sep. 11, 1990

[54] OPTICAL SENSOR

[75] Inventors: Roger E. Jones, Cambridge; Peter G. Hale, Chelmsford; Jolyon P. Willson, Cambridge, all of Great Britain

[73] Assignee: STC PLC, London, England

[21] Appl. No.: 313,391

[22] Filed: Feb. 21, 1989

Related U.S. Application Data

[63] Continuation-in-part of Ser. No. 33,067, Mar. 31, 1987, abandoned.

[30] Foreign Application Priority Data

Jul. 12, 1986 [GB] United Kingdom ................. 8617030

[51] Int. Cl.$^5$ .............................................. G01L 1/24
[52] U.S. Cl. .......................................... 73/800; 73/655; 73/778; 73/847; 250/227.14; 340/870.29
[58] Field of Search ..................... 73/866.1, 800, 650, 73/655, 657, 705, 773, 778, 862.59, 841, 847; 250/224, 227, 230, 231 R, 231 P, 236, 227.14, 231.11, 231.18; 350/6.6, 486, 487; 310/36, 325, 333; 340/870.28, 870.29; 382/66

[56] References Cited

U.S. PATENT DOCUMENTS

| | | | |
|---|---|---|---|
| 1,638,103 | 8/1927 | Koucka | 250/231 R X |
| 2,497,042 | 2/1950 | Doll | 340/870.28 X |
| 2,640,866 | 6/1953 | Powell | 250/230 X |
| 3,020,414 | 2/1962 | McKnight et al. | 250/230 X |
| 3,291,995 | 12/1966 | Schalkowsky | 250/231 R |
| 3,433,959 | 3/1969 | Atwood et al. | 250/230 |
| 3,538,772 | 11/1970 | Filloux | 73/705 X |
| 3,642,344 | 2/1972 | Corker | 310/36 X |
| 3,770,965 | 11/1973 | Edwards et al. | 250/231 R X |
| 3,842,353 | 10/1974 | Stewart | 73/705 X |
| 3,955,409 | 5/1976 | Moser et al. | 73/800 X |
| 4,269,506 | 5/1981 | Johnnson et al. | 73/800 X |
| 4,281,245 | 7/1981 | Brogardh et al. | 250/227 |
| 4,345,482 | 8/1982 | Adolfsson et al. | 73/653 X |
| 4,379,226 | 4/1983 | Sichlin et al. | 73/653 X |
| 4,432,239 | 2/1984 | Bykov | 73/800 |
| 4,590,374 | 5/1986 | Brewster | 250/338.1 |
| 4,743,752 | 5/1988 | Olsen et al. | 250/231 R X |
| 4,772,782 | 9/1988 | Longdon | 73/862.59 X |

FOREIGN PATENT DOCUMENTS

| | | | |
|---|---|---|---|
| 161671 | 11/1985 | European Pat. Off. | 250/231 R |
| 153442 | 1/1982 | German Democratic Rep. | 350/486 |
| 111430 | 9/1981 | Japan | 73/655 |
| 448767 | 3/1976 | U.S.S.R. | 73/800 |
| 679890 | 8/1979 | U.S.S.R. | 250/230 |
| 1513249 | 6/1978 | United Kingdom | 73/657 |
| 2121953 | 1/1984 | United Kingdom . | |

Primary Examiner—Tom Noland
Attorney, Agent, or Firm—Lee, Mann, Smith, McWilliams & Sweeney

[57] ABSTRACT

An optical sensor uses a torsion-mounted thin silicon paddle (1) with magnetically soft material on its back. A light beam falls on the front face and part of the beam is reflected to a photo-diode (4) whose output drives a current in a magnetizing coil (5). The magnetic field thus produced rotates the paddle out of the beam, which cuts off the light to the photo-diode. Thus the paddle oscillates with an amplitude which depends on the strain due to the torsion mounting. This modulates the light beam, and if they have different resonances several such sensors can share the same beam with a common read-out.

9 Claims, 3 Drawing Sheets

OPTICAL SENSOR

RELATED APPLICATION

This application is a continuation-in-part of U.S. Pat. application Ser. No. 33,067, filed Mar. 31, 1987, and now abandoned.

BACKGROUND OF THE INVENTION

This invention relates to sensor systems in which optical sensing systems are used.

Electro-mechanical resonating transducers are used as strain sensors in a variety of applications. Typically such a device comprises an oscillation system which is maintained in a state of oscillation by a feedback arrangement. The use of optical sensing systems in such devices is advantageous in that it reduces losses due to the feedback system.

One system in which optical techniques are used is described in British Patent Specification No. 2121953A (ITT Industries) to which corresponds U.S. Pat. No. 4,567,451 (J. C. Greenwood). In this, a transducer has an electrically supported paddle, typically of silicon, driven electrostatically at its natural frequency, or an harmonic thereof, by voltage pulses applied to an adjacent electrode. These pulses are derived from optical pulses fed via an optical fiber and reflected from the paddle on to a photo-diode array. The paddle's oscillators are sensed, also via the optical fiber, and used to control the formation of the optical pulses. Thus there is minimal coupling between the paddle and the drive sensing system.

Other systems using optical sensing techniques are described in U.S. Pat. No. 4,345,482 (Adolfsson et al) and U.S. Pat. No. 4,379,226 (Sichting et al).

An object of our invention is to produce a sensing arrangement which is superior to those described in the above mentioned documents.

SUMMARY OF THE INVENTION

According to the invention there is provided a sensor which includes a member so mounted at to be capable of oscillation, and a light-reflective surface on said member, wherein the member is so mounted that the reflective surface can be in the path of a light beam, wherein when the reflective surface is in the path of the light beam, the beam is reflected from the reflective surface on to a detector whose response applies a force to the member so as to rotate it in a direction out of the light beam, wherein a parameter to be sensed and measured influences the mounting of the member so as to rotate it into the beam, and wherein the feedback due to the action of the detector causes the member to rotate out of the beam, so that the member is caused to oscillate at a rate dependent on the parameter to be sensed, so that, due to the oscillation the light beam is modulated in accordance with the parameter to be sensed.

The feedback techniques used can be of different types, such as opto-electrostatic and opto-thermal. In the latter case the feedback technique exploits the effect of heat due to the absorption of the light beam by the deflector. Such as arrangement generates torque to cause the rotation due to thermal expansion. Hence a photo-detector is not needed.

As will be seen however, the preferred arrangement uses what could be referred to as "opto-magnetic" feedback.

Hence, according to the invention, there is also provided a sensor which includes a plate-like member of a thin material having a light-reflective surface, wherein the plate-like member is mounted by torsion supports so as to be capable of oscillation, wherein the member is so mounted that its reflective surface can be in the path of a light beam, wherein when the reflective surface is in the path of the light beam the beam is reflected from the reflective surface on to a photodetector, wherein the photodetector responds to said incident light to generate a force adapted to rotate the plate-like member in a direction out of the light beam, wherein a parameter to be sensed and measured strains the torsion mounting of the plate-like member to rotate it into the beam, and wherein the feedback due to the action of the photodetector causes the plate-like member to rotate out of the beam, so that the plate-like member is caused to oscillate at a rate dependent on the magnitude of the parameter to be sensed, so that, due to the oscillation of the plate-like member the light beam is modulated in accordance with the parameter to be sensed.

A wide variety of parameters can be sensed when using an arrangement such as set out above, e.g. temperature or pressure. Whatever parameter is being sensed, it is caused to vary the torsional influence in accordance with variations in the value of the parameter to be sensed.

BRIEF DESCRIPTION OF THE DRAWINGS

Embodiments of the invention will now be described with reference to the accompanying drawings, in which.

DESCRIPTION OF PREFERRED EMBODIMENT

The sensor arrangement uses mechanical self-resonant arrangements, each with a feedback arrangement which can use electromagnetic, electro-static or thermal deflection. The arrangement shown in FIG. 1 uses a free-space optical system with electro-magnetic feedback for measuring strain.

Figure 1:
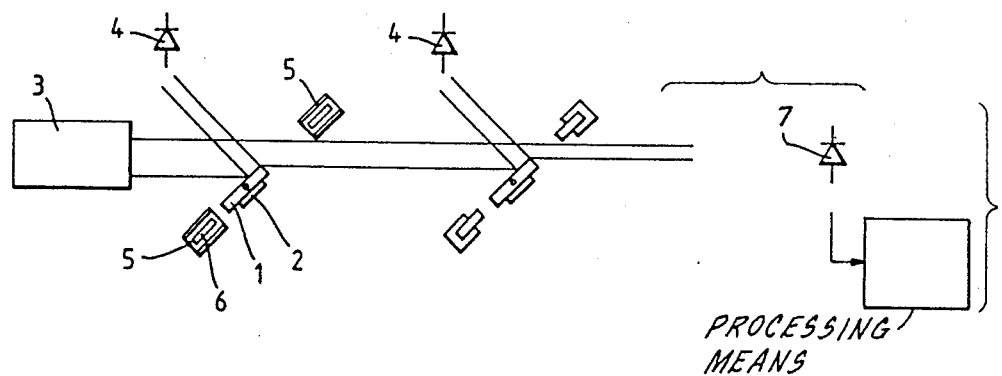
FIG. 1 shows a free-space sensing multiplexing arrangement in which two or more sensor devices are used.

The mechanical arrangements used in the embodiments described herein use micromachined silicon paddles in torsion suspension. In FIG. 1 we see such a paddle 1 with ferromagnetic material 2 bonded to its back face. An optical beam from a helium-neon laser 3 is provided, part of which is reflected from the silicon paddle onto a photo-diode indicated schematically at 4. The current thus generated causes, via suitable amplification if necessary, a current to flow in a coil 5 provided with magnetic pole pieces such as 6. This induces a magnetic field which is coupled through the pole-pieces to generate a torque on the paddle. The torque rotates the paddle out of the beam, so that the amplitude of the light which reaches the photo-diode 4 falls. Thus the torque applied by the magnetic feedback is removed, so the paddle swings back under the influence of the parameter to be sensed. Thus the paddle is caused to resonate at a rate dependent on the magnitude of the parameter to be sensed.

As the paddle oscillates, it amplitude-modulates the optical beam, which amplitude modulation is detected by a detector formed by a photodiode indicated at 7. The resonant frequency of the paddle, which constitutes the amplitude modulation, depends on the strain in the torsion suspension, so the strain can be inferred by measuring the modulation frequency. Hence the measurement of the modulation frequency provides a measure of the parameter influencing the paddle.

Figure 2:
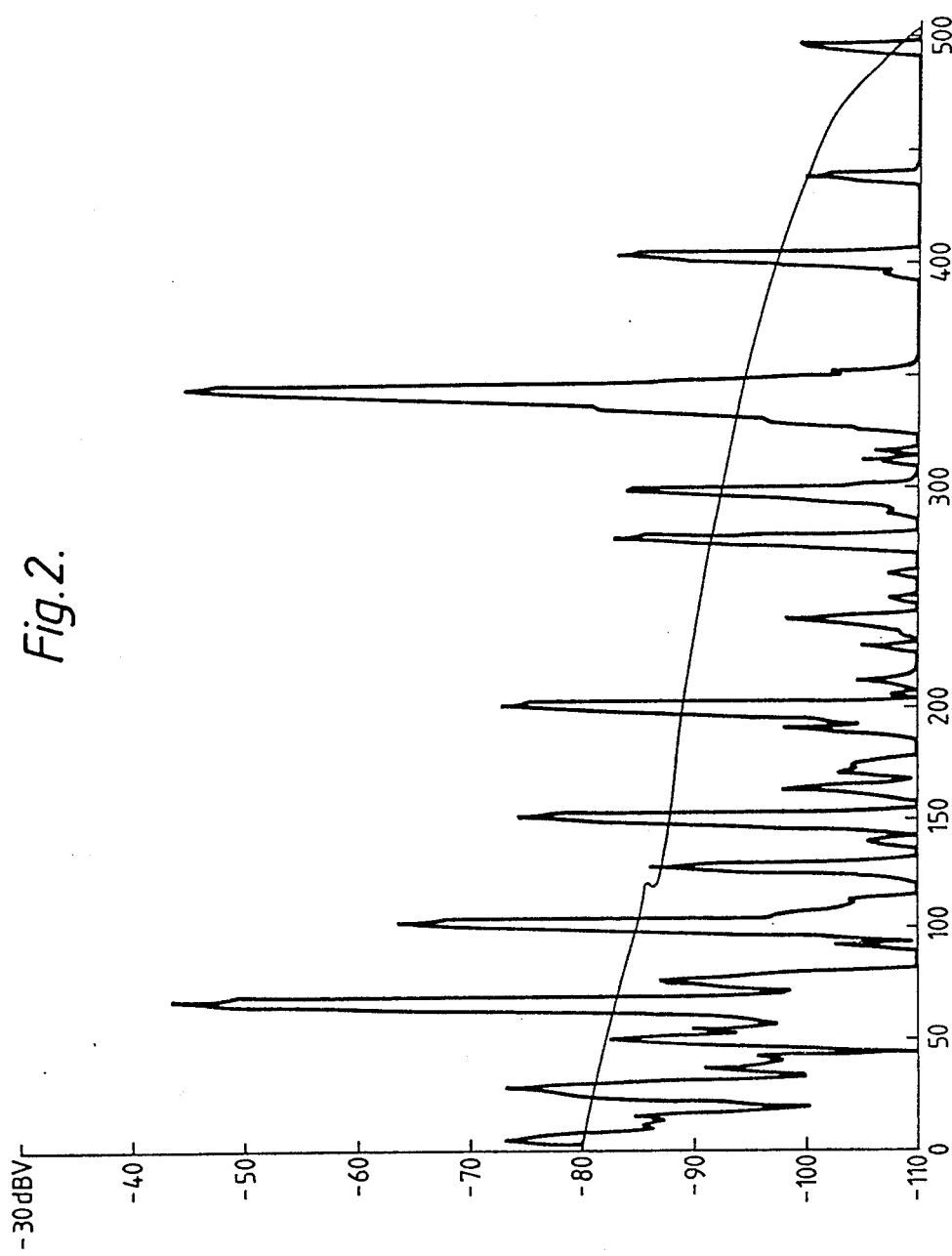
FIG. 2 is an explanatory graph.

A number of such strain gauge arrangements can be multiplexed on to the same light beam if their resonant frequencies differ. Thus FIG. 1 shows two such strain gauge arrangements using the same optical beam. FIG. 2 shows the output of the photo-diode 7 for an assembly in which there are two structures resonating respectively at 64 Hz and 342 Hz.

Figure 3:
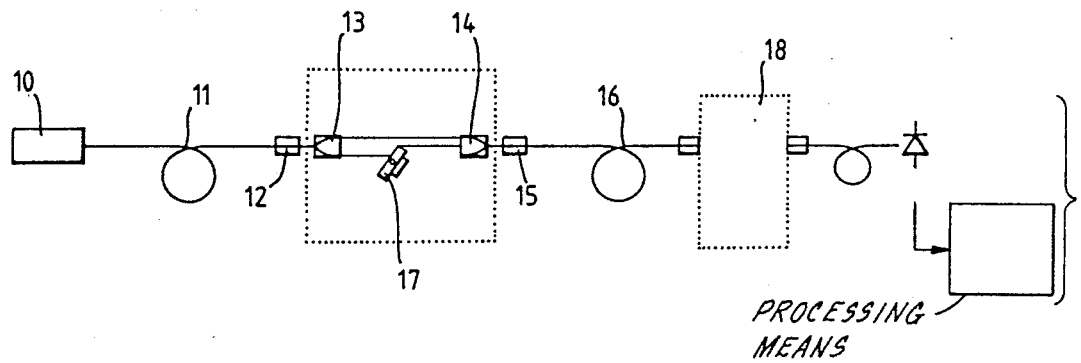
FIG. 3 is a further example of a sensing arrangement using more than one sensor.

An optical fiber version of the sensor arrangement is shown in FIG. 3. Here we have a light-emitting diode or low-coherence laser 10 feeding light into multimode fiber 11. For the first sensor, the fiber is terminated at an optical connector 12 which is followed by a graded-index lens 13 from which an optical beam is directed on to another graded-index lens 14 from which the light passes via another connector 15 to a further length of multimode fiber 16.

Between the lenses and in the "line of fire" of the optical beam is a silicon paddle structure 17 such as that shown at 2-4-5 in FIG. 1. This is shown in simplified form in FIG. 3. Here the parameter to be sensed modulates the beam in accordance with the strain applied to the torsion supports of the silicon paddle. As can be seen, two or more such structures can be connected in series via optical fibers, with one output, as long as the structures have different resonant frequencies. Another such structure is indicated schematically at 18.

Such an arrangement has the advantage that the spatial information is scrambled in the length of fiber between two sensors which avoids the problem of a downstream sensor blocking out the modulated fraction of the optical signal corresponding to a previous sensor.

The techniques described above can be used for measuring a variety of parameters, such as temperature and pressure, by using suitable mounts to strain the resonant structure.

Figure 4:
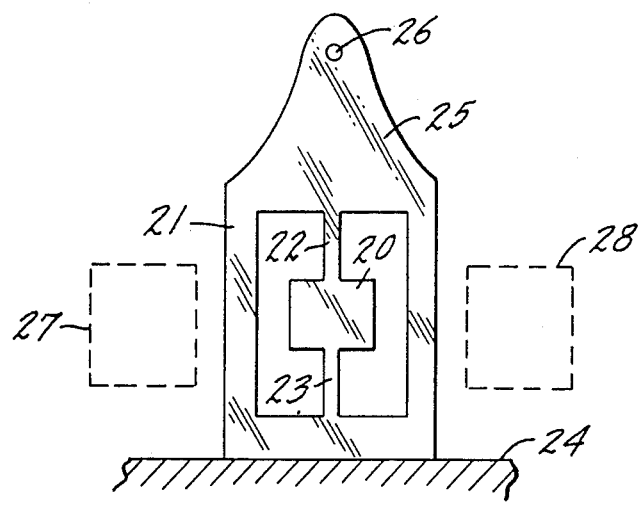
FIG. 4 shows in simplified manner the configuration of an oscillatory member as used in the embodiments of FIGS. 1 and 3.

FIG. 4 shows the paddle 1, 2 in somewhat more detail, looking at its reflective surface side. The paddle consists of a rectangle 20 of thin silicon coupled to a frame 21 also of this silicon by thin torsion members 22, 23. The rectangle, the frame and the torsion members are integrally formed from a single poriton of silicon. The frame is supported, as shown, by a base 24.

In the reverse side of the paddle 20 there is the thin layer of magnetically soft material, but as it is on the reverse side this layer is not visible in FIG. 4.

The frame has an extension 25, to which the parameter to be sensed and measured is applied. This application can be done in various ways, such as via a push-rod whose end is indicated at 26. Thus, the parameter to be dealt with is converted into a force either directly or by a diaphram in the case of a pressure, or (as shown) via the push rod in the case of a displacement. The force thus applied to the frame strains the whole structure, including the torsion rod supports 22, 23, thus altering its resonant frequency.

The resonant frequency referred to above is, of course, the frequency at which the paddle oscillates and this modulates the light beam reflected from it. One example of a sensor of this general type has been described in U.S. Pat. No. 4,590,374.

The processing needed to determine the oscillation frequencies of two or more devices "multiplexed" on to the light beam involves spectral analysis. This, as is well-known, can be carried out using a Fast Fourier Transform Spectrum Analyser, which was in fact the instrument used to generate the output reproduced as FIG. 2. Alternatively, and preferably, it is possible to use a number of phase-locked loops operating in bands each corresponding to one of the sensors.

The coils and pole-pieces via which a signal is fed back to the paddle are shown dotted at 28 and 27. Although shown schematically at the sides of the paddle, they would in fact be at right angels thereto, so that the flat magnetic surface lies between the pole-pieces of the coils. Such coils and pole-pieces can follow well-established practice.

Figure 5:
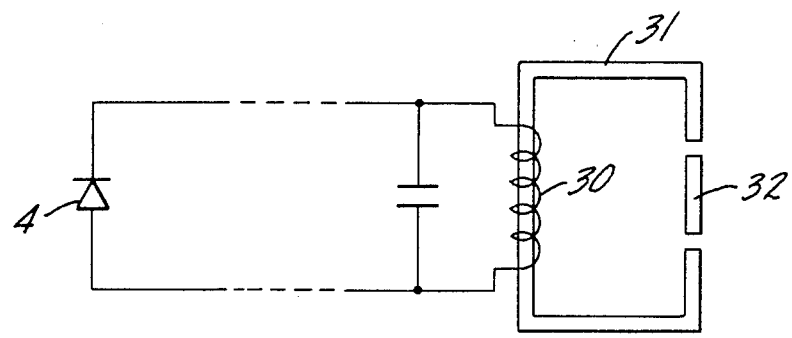
FIG. 5 shows in simplified manner circuit details relative to the arrangements of FIGS. 1 and 3.

The circuitry used to feed back a signal to the coil is shown in FIG. 5, where we see a photo-diode such as 4, FIG. 1, connected to a coil 30 wound on a core 31, with pole-pieces adjacent to the paddle, indicated schematically at 32.

We claim:

1. An opto-electrical sensor which includes:
   a plate-like member of thin silicon which has a light-reflective surface and a magnetically soft layer on one of its surfaces;
   torsion supports for said plate-like member so arranged that the plate-like member is capable of oscillation;
   a coil which embraces said plate-like member and can be energised by an electrical current;
   a light source from which a light beam is obtained, the light-reflective surface of the plate-like member being at least partially in the path of the light beam;
   a photo-detector so located that when the reflective surface of the plate-like member is in the path of said light beam that light beam is reflected from the reflective surface on to the photo-detector; and
   connections from the photo-detector to the coil whereby the coil is energised in response to the production of a current output from the photo-detector due to light reflected from said plate-like member reaching the photo-detector;
   wherein the current thus applied to the coil applies a magnetic force to the plate-like member in such a way as to rotate that member out of the light beam;
   wherein a parameter to be sensed and measured influences the plate-like member in such a way as to rotate the plate-like member into the beam; and
   wherein the action of the photo-detector thus causes feedback to be applied magnetically to the plate-like member in such a way as to rotate it out of the beam, whereby the plate-like member is caused to oscillate at a rate dependent on the magnitude of the parameter to be sensed and measured, so that, due to the oscillation of the plate-like member the lightbeam is modulated in accordance with the magnitude of the parameter to be sensed and measured.

2. A sensor as claimed in claim 1, wherein the light beam is a free-space beam from a helium-neon laser.

3. A sensor assembly including a plurality of sensors each as claimed in claim 1 and driven by the same said light beam.

4. A sensor as claimed in claim 1, wherein the light beam is obtained from a light emitting diode which feeds a length of optical multimode fiber, and wherein the light from the fiber is applied to the sensor's reflecting surface from an optical connector and a graded-index lens.

5. A sensor as claimed in claim 4. wherein the light beam after having been modulated by the oscillation of the plate-like member, passes via another graded index lens and optical connector to a further length of multimode optical fiber.

6. A sensor assembly which includes a sensor as claimed in claim 5, wherein the further length of multimode fiber gives access to another sensor.

7. A sensor assembly as claimed in claim 6, wherein after the final sensor the light falls on a photo-diode whose output is modulated in accordance with all of the sensors, and wherein the output of said last-mentioned photo-diode is processed to determine the magnitudes of the parameters being monitored.

8. A sensor as claimed in claim 1, wherein after the sensor, the light falls on a photo-diode whose output is modulated in accordance with the sensor, and wherein the electrical output of said last-mentioned photo-diode is processed to determine the magnitude of the parameter being monitored.

9. A sensor as claimed in claim 1, wherein the light beam is obtained from a laser which feeds a length of optical multimode fiber, and wherein the light from the fiber is applied to the sensor's reflecting surface from an optical connector and a graded-index lens.

* * * * *